United States Patent
Okada et al.

(10) Patent No.: US 7,584,252 B2
(45) Date of Patent: Sep. 1, 2009

(54) OBJECT COLLABORATION APPARATUS USING MESSAGE TYPE

(75) Inventors: Makoto Okada, Kawasaki (JP); Tadashige Iwao, Kawasaki (JP); Yuji Wada, Kawasaki (JP); Masatoshi Shiouchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 416 days.

(21) Appl. No.: 09/988,566

(22) Filed: Nov. 20, 2001

(65) Prior Publication Data

US 2002/0029300 A1 Mar. 7, 2002

Related U.S. Application Data

(63) Continuation of application No. PCT/JP99/04100, filed on Jul. 29, 1999.

(51) Int. Cl.
G06F 15/16 (2006.01)
(52) U.S. Cl. ............... 709/206; 709/220; 709/224
(58) Field of Classification Search ........... 709/206, 709/223, 224, 230, 220
See application file for complete search history.

(56) References Cited

U.S. PATENT DOCUMENTS

| | | | | |
|---|---|---|---|---|
| 5,379,426 A | * | 1/1995 | Foss et al. | 719/315 |
| 5,842,198 A | * | 11/1998 | Suzuki et al. | 707/2 |
| 6,324,656 B1 | * | 11/2001 | Gleichauf et al. | 714/37 |
| 6,401,111 B1 | * | 6/2002 | Dan et al. | 709/204 |
| 6,412,000 B1 | * | 6/2002 | Riddle et al. | 709/224 |
| 6,442,620 B1 | * | 8/2002 | Thatte et al. | 719/316 |
| 6,499,107 B1 | * | 12/2002 | Gleichauf et al. | 713/201 |
| 6,507,866 B1 | * | 1/2003 | Barchi | 709/207 |
| 6,678,822 B1 | * | 1/2004 | Morar et al. | 713/182 |
| 2002/0023180 A1 | * | 2/2002 | Klimczak et al. | 710/8 |
| 2006/0206866 A1 | * | 9/2006 | Eldrige et al. | 717/122 |

FOREIGN PATENT DOCUMENTS

JP 11-161493 6/1999

OTHER PUBLICATIONS

Ptacek et al., "Insertion, Evasion, and Denial of Service: Eluding Network Intrusion Detection," Jan. 1998, Secure Networks, Inc., http://www.insecure.org/stf/secnet_ids/secnet_ids.html, pp. 1-54.*

(Continued)

*Primary Examiner*—John Follansbee
*Assistant Examiner*—Nghi V Tran
(74) *Attorney, Agent, or Firm*—Staas & Halsey LLP

(57) ABSTRACT

In object collaboration via a message, various message types are dealt with. Furthermore, synchronization processing between objects is conducted easily and flexibly. A message type is previously classified and arranged hierarchically. A message/action reaction table 103 arranged on the message type basis is held in a message/action reaction relationship storing part 102. A received message is subjected to matching by a message type classifying/matching part 107. When the received message is matched with a message type dealt with by the message/action reaction relationship storing part 102, the message is given to an action executing part 104. When the received message is not matched with a message type dealt with by the message/action reaction relationship storing part 102, the message is discarded.

8 Claims, 10 Drawing Sheets

OTHER PUBLICATIONS

Iwao, Tadashige, et al., "Field-Reactor Model for Distributed Objects", Information Processing Society of Japan, Jan. 29, 1998.

Iwao, Tadashige, et al., "Distributed Object Collaboration Using Field Reactor Library", Multimedia, Distribution, Collabroation and Mobile (DICOMO '99) Symposium, Jun. 1999.

Okada, Makoto, et al., "Loosely-Coupled Collaboration System for Distributed Object Using Awareness Analogy", Workshop of the Multimedia Communication and Distributed Processing, Nov. 1998.

Japanese Office Action issued Apr. 13, 2007 in JP2001-514664.

T. Iwoa et al., "Distributed Object Collaboration Using Field Reactor Library".

* cited by examiner

```
public class msgStringTupple extends msgObjType
{
        public String subject, verb, obj1, obj2;

public boolean isMatch(msgObjType msg)
        {
                boolean b;
                msgStringTupple camsg;

if (getClass()!=msg.getClass()) return false;

camsg=(msgStringTupple)msg;

if (!isMatch(subject, camsg.subject)) return false;
                if (!isMatch(verb, camsg.verb)) return false;
                if (!isMatch(obj1, camsg.obj1)) return false;
                if (!isMatch(obj2, camsg.obj2)) return false;

return true;
        } boolean isMatch(String str1, String str2)
        {
                if (str1=="*" || str2=="*" || str1==str2) return true;

return false;
        }
}
```

FIG. 5

```
import parser.*;
import match_maker.*;

public class XMLMsg extends msgObjType
{
        public   Parser m_pattern;
        public          MatchMakerResult res;

public void SetPattern(String XMLtext)
        {
            m_pattern=new Parser();
            if (!m_pattern.parse(XMLtext)) m_pattern=null;
        } public boolean isMatch(msgObjType msg)
        {
            XMLMsg xmsg;
            MatchMaker match;

if (getClass()!=msg.getClass()) return false;
            xmsg=(XMLMsg)msg;

match=new MatchMaker();
            res=match.match_make(xmsg.m_pattern, m_pattern);

if (res.size()==0) return false;
            return true;
        }
}
```

FIG. 6

|   S    |      V      |   O          |   O          |   Action    |
|--------|-------------|--------------|--------------|-------------|
| Master | MouseMove   | X coordinate | Y coordinate | Move        |

(a)

|   S    |      V      |   O          |   O          |   Action    |
|--------|-------------|--------------|--------------|-------------|
| Master | MouseMove   | X coordinate | Y coordinate | Move        |

(b)

|   S    |      V      |   O          |   O          |   Action    |
|--------|-------------|--------------|--------------|-------------|
| Master | MouseMove   | X coordinate | Y coordinate | Move        |

(c)

|   S    |      V      |   O          |   O          |   Action    |
|--------|-------------|--------------|--------------|-------------|
| *      | MouseMove   | X coordinate | Y coordinate | MasterOut   |

(d)

|   S    |      V      |   O          |   O          |
|--------|-------------|--------------|--------------|
| Master | MouseMove   | X coordinate | Y coordinate |

OBJECT COLLABORATION APPARATUS USING MESSAGE TYPE

This application is a continuing application, filed under 35 U.S.C. §111(a), of International Application PCT/JP99/04100, filed Jul. 29, 1999.

TECHNICAL FIELD

The present invention relates to an object collaboration apparatus for conducting collaboration processing such as interaction and collaboration of a computer group or an object group. In particular, the present invention relates to an object collaboration apparatus for configuring a system, in which a plurality of processes are generated in an object-oriented environment and which gradually changes so as to flexibly adapt to a change in the environment through a computer network.

BACKGROUND ART

Recently, along with the advancement of networking, systems are becoming popular in which a plurality of objects distributed on a network collaborate with each other to conduct processing. As a technique of allowing a plurality of objects to collaborate with each other to conduct processing, studies of object-oriented programming and component technology have been conducted.

As common specifications of object-oriented programming, CORBA (The Common Object Request Broker: Architecture and Specification) is known. FIG. 10 shows an example of object collaboration in a client/server system based on the CORBA. This system conducts a series of processing using collaboration between a client application and a server application (i.e., object collaboration).

According to the CORBA, an interface of service provided by a client and a server is described by IDL (Interface Definition Language). Herein, regarding an operation group to be executed by an object, an operation name, parameters, a return value, exceptional processing upon occurrence of an error, additional information, and the like are defined. The contents defined by the IDL are compiled by a dedicated compiler, whereby a stub for a client and a skeleton for a server are generated. A client application starts an operation by invoking a routine provided by the stub. The stub and skeleton are generated by programming language used by a corresponding client application or server application. Thus, it is becoming easy to configure object collaboration processing by the CORBA or the like. However, in order to actually configure such collaboration processing, for example, by using the above-mentioned CORBA, it is required to understand the CORBA. In addition, it is required to design an object in accordance with the specifications of the CORBA and to define an interface of service by the IDL. More specifically, it is required for a person configuring a system to know a method for using the CORBA. It is also required for the person to be aware of the relationship between the respective objects. That is, it is required to clarify which processing is conducted by each object and what are transfer parameters required for conducting the processing.

Herein, it is assumed that an object is replaced with a human being. In this case, it is desired that whether or not each object receives information flowing through a communication space and which processing is conducted with respect to the received information are varied. So-called free collaboration between objects is desired. As a technique of realizing this, there is an object collaboration apparatus.

According to the technique of the object collaboration apparatus, a message (that does not specify an object of a receiver) flows through a communication space shared by the respective objects, and each object captures the message. Each object is provided with a message/action reaction table. Each object checks whether or not an action with respect to the captured message is described in the message/action reaction table held in each object, and executes the corresponding action if it is described. In terms of the operation of an object, the object reacts to a particular message, and does not react to the other messages. In the object collaboration apparatus, objects collaborate with each other loosely and flexibly via a message, and it is easy to configure and change a collaboration relationship between objects. Thus, an object collaboration apparatus using a message/action reaction table is an excellent technique. The above-mentioned object collaboration apparatus has a basic configuration of an object collaboration apparatus using a message/action reaction table. Further application techniques have been studied on the following points.

A first study is directed to flexible handling of the difference in a message configuration suitable for each platform in the case where object collaboration is conducted by using various platforms. In the case of assuming wide scalability, i.e., any platform capable of receiving a message such as PDA (Personal Digital Assistance) provided with an OS for small scale equipment, a personal computer, a UNIX workstation, and a main frame provided with an OS for large scale equipment, a message configuration and a message length may be varied which are suitable to deal with for a platform in each range. It is convenient to provide a system in which a message can be received by platforms of all the objects participating in object collaboration, and performance can be exhibited sufficiently for a platform in each range.

A second study is directed to enhancement of a processing efficiency and a processing speed in the case where the number of collaborating objects and the number of platforms are increased, and the number of messages flowing through a core field to be a communication path is increased.

A third study is directed to configuration of synchronization collaboration between objects. Herein, synchronization collaboration refers to that an event of a particular object (object of a collaboration target) follows an event of a particular object (object of a collaboration origin). Typically, the synchronization collaboration refers to that an object of a collaboration target executes the same event (typically, movement of a mouse) in synchronization with an event of an object of a collaboration origin.

DISCLOSURE OF INVENTION

It is an object of the present invention to sufficiently utilize features of a conventional object collaboration apparatus to provide further excellent technical features.

A first object of the present invention is to configure an object collaboration apparatus of the present invention using platforms in various ranges assuming wide scalability, and realize message processing using a message configuration and a message length that can be suitably dealt with by objects operated on the platforms.

A second object of the present invention is to provide a system that attempts to reduce a load and enhance a speed of message matching processing and the like of an object even if an object collaboration apparatus has a large scale.

A third object of the present invention is to provide a system in which an object collaboration relationship can be easily and flexibly changed in the case where there is a description of an action, such as synchronization processing between object collaboration apparatuses, related to information on an entity name of an object that transmits a message.

In order to achieve the above-mentioned objects, a first object collaboration apparatus of the present invention operated in accordance with a message/action reaction relationship includes: a message receiving part for allowing each object to monitor and capture a message transmitted on a network; a message/action reaction relationship storing part for storing contents of an action that is a reaction to the message; and an action executing part for executing processing in accordance with the contents of an action, wherein the apparatus further includes a message type classifying/matching part, the message type classifying/matching part stores and holds a message type dealt with by the message/action reaction relationship storing part, analyzes a message type of a received message, conducts matching processing for determining whether or not a type of the received message is matched with the message type dealt with by the message/action reaction relationship storing part, and if matched, gives the received message to the message/action reaction relationship storing part, and an action is executed in accordance with the message/action reaction relationship based on the message given to the message/action reaction relationship storing part.

According to the above-mentioned configuration, a received message can be selectively captured by using message type classification, and matching processing can be conducted with respect to only a message of a type dealt with by an object. Therefore, an object collaboration relationship can be configured using a message with a message configuration and a message length suitable for each platform. Furthermore, since unnecessary matching processing can be omitted, the load of an object can be reduced, and the speed of matching processing can be enhanced.

Herein, it is preferable that classification of the message type has a hierarchy. If classification hierarchy of the message type has a classification hierarchy of a class derivation message type and a class derivation origin message type, using an idea of inheritance in object-oriented programming, the load of an object can be further reduced, and the speed of matching processing can be further enhanced.

Next, in order to achieve the above-mentioned objects, a second object collaboration apparatus of the present invention operated in accordance with a message/action reaction relationship includes: a message receiving part for allowing each object to monitor and capture a message transmitted on a network; a message/action reaction relationship storing part for storing contents of an action that is a reaction to the message; and an action executing part for executing processing in accordance with the contents of an action, wherein the apparatus further includes an entity name rewrite object for, with respect to a message received from one object entity, rewriting object entity name information in a message representing the one object entity to another object entity name information representing another object entity, and returning the message to the network.

According to the above-mentioned configuration, information on an entity name of an object that transmits a message can be rewritten to an entity name of another object, and an object collaboration relationship can be easily and flexibly configured/changed. For example, if action contents desired to be subjected to the synchronization processing are described by using the object entity name to be a rewrite target, in the message/action reaction relationship storing part of an object to be a slave of the synchronization processing, and the entity name rewrite object rewrites the object entity name written as the entity name rewrite target into an object entity name to be a master object of the synchronization processing, synchronization processing between objects can be easily and flexibly realized.

Next, in order to achieve the above-mentioned objects, there is provided a computer-readable recording medium of the present invention storing a processing program for realizing an object collaboration apparatus operated in accordance with a message/action reaction relationship, the program including: a message receiving processing operation of allowing an object to monitor and capture a message transmitted on a network; a message/action reaction relationship storing processing operation of storing contents of an action that is a reaction to the message; an action executing processing operation of executing processing in accordance with the contents of an action; a processing operation of storing and holding a message type dealt with in the message/action reaction relationship storing processing operation; a processing operation of analyzing a message type of a received message; a processing operation of conducting matching processing for determining whether or not a type of the received message is matched with the message type dealt with by the message/action reaction relationship storing part; and a processing operation of giving the message to the message/action reaction relationship storing part only in a case where the type of the received message is matched, wherein only for a message whose type is matched, an action is executed in accordance with a message/action reaction relationship.

Furthermore, there is provided a computer-readable recording medium of the present invention storing a processing program for realizing an object collaboration apparatus for rewriting an entity name of a message transmitted by one object to an entity name of another object, operated in accordance with a message/action reaction relationship, the program including: a message receiving processing operation of allowing each object to monitor and capture a message transmitted on a network; a message/action reaction relationship storing processing operation of storing contents of an action that is a reaction to the message; an action executing processing operation of executing processing in accordance with the contents of an action; and an entity name rewrite processing operation of, with respect to a message received from one object entity, rewriting object entity name information in a message representing the one object entity to another object entity name information representing another object entity, and returning the message to the network.

The processing program for realizing the above-mentioned object collaboration apparatus is read by a computer via the recording medium, whereby the object collaboration apparatus of the present invention can be configured using a computer apparatus, and a user can configure an object collaboration apparatus capable of easily obtaining an object collaboration relationship.

BRIEF DESCRIPTION OF DRAWINGS

FIG. 5 shows an example of a message configuration dealing with a message type having a message string tuple type and corresponding to an SVOO.

FIG. 6 shows an example of a message configuration dealing with a message type described by XML such as XMLMsg.

FIG. 8 shows examples of information contained in message/action reaction tables of the reactor objects 70a to 70c and the entity name rewrite object 71 of Embodiment 2 according to the present invention.

BEST MODE FOR CARRYING OUT THE INVENTION

Hereinafter, embodiments of an object collaboration apparatus of the present invention will be described with reference to the drawings.

EMBODIMENT 1

In Embodiment 1, an object collaboration apparatus will be described which uses type classification of message patterns and matching of message patterns.

First, a basic principle of object collaboration will be briefly described. According to object collaboration, the relationship between collaborating objects is not made a tight relationship in which objects mutually depend upon internal states and internal functions. Instead, a function is dynamically configured by collaboration between objects specifying a loose relationship between collaborating objects. In order to understand the principle of object collaboration, an Awareness model is useful, which is seen in communication between human beings and actions collaborating with each other. Collaboration between distributed objects is assumed as follows: information processing similar to Awareness involved between human beings is conducted, and objects collaborate with each other based on the detected Awareness. Collaboration between distributed objects or collaboration between computers based on The Awareness analogy can be realized by the following configuration.

1. An Awareness message is shared or broadcast.
2. An object receiving an Awareness message has a correspondence relationship between a message and an action.
3. In an object transmitting or receiving an Awareness message, a message is separated from an action.

By using the property that a message and an action in the Awareness analogy are separated or separable, it is possible to add two important elements such as participation and mediation as an interaction between objects, and to enhance a degree of freedom of collaboration between objects or between computers connected to a network.

Figure 1:
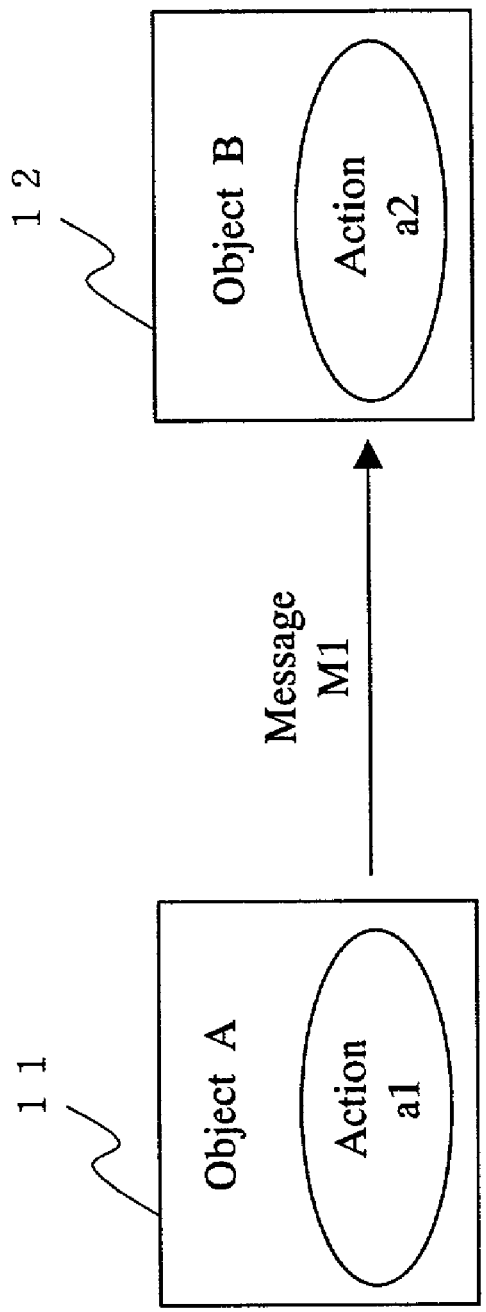
FIG. 1 schematically shows loosely coupled collaboration between objects in the Awareness analogy.

FIG. 1 schematically shows loosely coupled collaboration between objects in the Awareness analogy.

In FIG. 1, reference numerals 11 and 12 denote an object A and an object B, which are respectively entities for transmitting/receiving an Awareness message. "M1" denotes an Awareness message. "a1" denotes an action specified in the object A (11), and "a2" denotes an action specified in the object B (12). An arrow in the figure represents transmission of a message when a starting point is an object, and reception of a message when an ending point is an object. Furthermore, it is assumed that each object has its own action as an internal state.

In FIG. 1, collaboration between the object A (11) and the object B (12) is conducted via the message "M1". In the Awareness analogy, the object A (11) transmits a message basically without knowing the object B (12) and an internal function of the object B (12). Furthermore, the object A (11) does not need to specify the object B (12) to transmit a message, and transmits the message "M1" based on its own state and contents of processing. The object B (12) monitors a message flowing on a communication path. Upon detecting the message "M1", the object B (12) reacts to start the action "a2". Thus, the objects A and B can have significant collaboration, which is not caused by direct connection between the object A (11) and the object B (12), but by connection between the message "M1" and the action "a2" of the object B (12). In contrast, when a message is different from the message "M1", the object B (12) does not react as long as there is no other action connected to the message. Thus, collaboration between objects is loosely coupled via a message, whereby a degree of freedom of collaboration between objects is enhanced. That is, unlike conventional computer network communication, it is not required to specify an address of a communication partner and contents of a processing request. An object only needs to transmit an Awareness message representing its own status, processing results, and the like on a network, and each terminal monitoring the network detects the message and autonomously reacts to it when a corresponding action is specified.

In the Awareness analogy, there is no particular limit to a communication path. The communication path may be any path for mediating a medium that can be commonly received signals, such as radio, a voice, and light, as well as a physical network such as a LAN. Furthermore, as the communication path, a recording medium such as a memory that can be commonly invoked may be used. Furthermore, the communication path may be a virtual existence using a port address.

A basic idea of object collaboration based on the Awareness analogy has been described as above.

Figure 2:
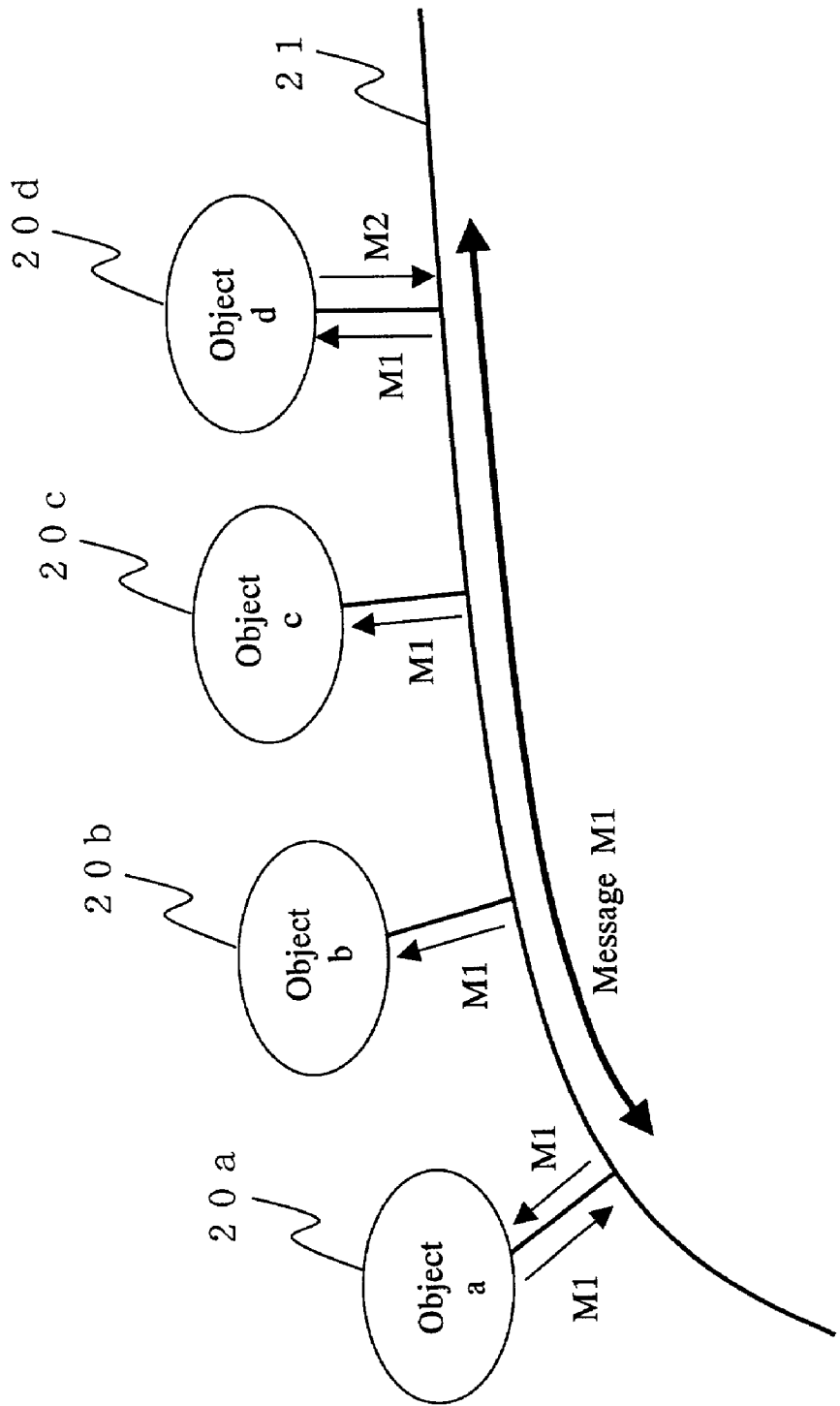
FIG. 2 shows a concept in which a plurality of objects are connected to each other on a core field that is a common communication space, and object collaboration is realized via a message.

FIG. 2 shows a concept in which a plurality of objects are connected on a core field that is a common communication space, and object collaboration is realized via a message. Reference numeral 20 (20a to 20d) denotes objects, which are reactor objects capable of conducting action reaction with respect to a received message. Service based on a reaction relationship of a message/action is provided on the basis of the object, and a plurality of the objects collaborate with each other via a message, whereby an object collaboration apparatus is configured. In an example shown in FIG. 2, four objects 20a to 20d are shown. It is appreciated that the present invention is not limited to a configuration in which one object 20 is configured for a platform of one personal computer, and a number of objects 20 may be configured on one platform. Reference numeral 21 denotes a core field, which is a communication space connecting the objects 20 to each other and is to be a basic unit through which a message is transmitted. The core field may be a virtual communication path connecting a number of objects in one platform or may be a communication path such as a LAN connecting a plurality of platforms. FIG. 2 exemplifies a concept in which the object 20*a* transmits the message "M1" on the core field 21, and the message "M1" is received by the objects 20*a* to 20*d* via the core field. The object 20*a* that transmits the message M1 also monitors and captures a message on the core field 21, so that the object 20*a* also receives the message "M1". In this example, the object 20*d* reacts to the received message "M1", and transmits a new message "M2" on the core field as one action with respect to the message "M1". The message M2 is also received by the objects 20*a* to 20*d* via the core field.

The above-mentioned reaction relationship of an action with respect to a received message is based on a message/action reaction table 103 held by a message action relationship storing part as described later. It is checked whether or not an action with respect to the captured message M1 is described in the reaction table 103, and when the action is described, the action is executed by an action executing part 104. The contents of the action include execution of service provided by an application or the like, and transmission of a message on the core field 21. Due to an action or a message transmitted as a part of the action, a message/action reaction in the subsequent stages occurs, whereby loosely coupled and flexible collaboration between objects via a message is realized.

A basic principle of object collaboration via a message is as described above.

The object collaboration apparatus of Embodiment 1 classifies types of message patterns transmitted in a common communication space between objects. When receiving the message, an object conducts matching of a message pattern. The object captures only a message that is matched with a message pattern dealt with by the object, and executes a message/action reaction.

Figure 3:
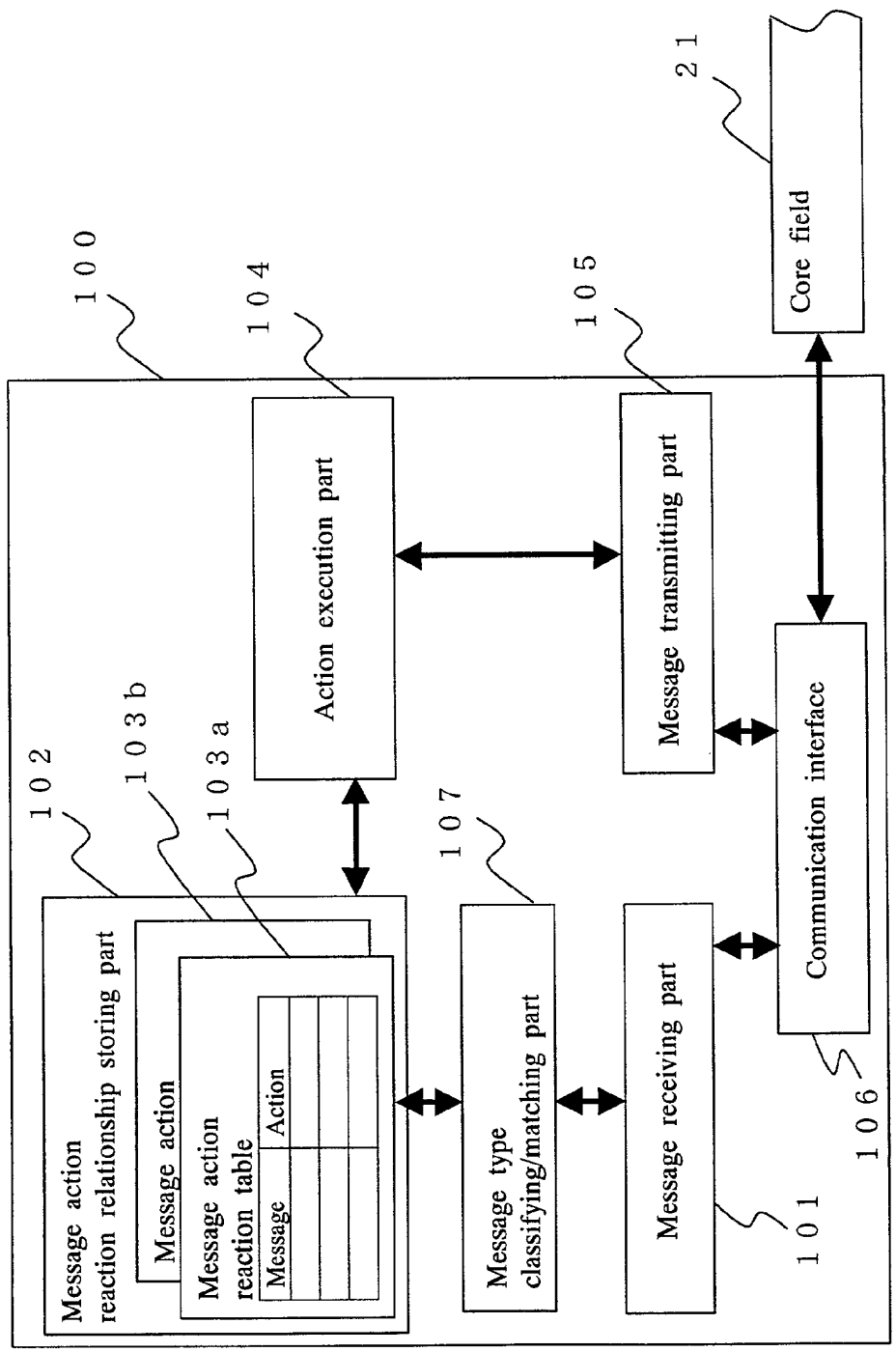
FIG. 3 is a block diagram schematically showing a configuration of an object collaboration apparatus of Embodiment 1 according to the present invention.

FIG. 3 shows an example of a basic configuration of the object collaboration apparatus of Embodiment 1. Reference numeral 100 denotes a platform constituting the object collaboration apparatus. The object collaboration apparatus of the present invention can be realized even if various platforms are present. Therefore, the kind of the platform does not need to be particularly limited, and a personal computer, a workstation, a host computer, and the like may be used. The object collaboration apparatus of Embodiment 1 provides service based on a relationship of a message/action reaction using an object as a unit. A plurality of the objects collaborate with each other via a message, whereby the object collaboration apparatus is configured. It is appreciated that one object may not be configured for a platform such as one personal computer, and a number of objects may be configured on one platform 100.

Each element of the object shown in FIG. 3 will be described. Reference numeral 101 denotes a message receiving part for monitoring and capturing a message transmitted on the network. Reference numeral 102 denotes a message/action reaction relationship storing part for storing contents of an action that is a reaction to a message. The message/action reaction relationship storing part 102 is provided with a message/action reaction table (reaction table) 103 for holding message/action reaction relationships. As described above, in the message/action reaction table 103, one table corresponds to only a particular type in message type classification. The message/action reaction relationship storing part 102 may hold a plurality of message/action reaction tables 103 as long as they are arranged on the message type basis. In an example in FIG. 3, the message/action reaction relationship storing part 102 includes two message/action reaction tables 103*a* and 103*b*.

Reference numeral 104 denotes an action executing part for executing processing in accordance with the contents of a specified action. Reference numeral 105 denotes a message transmitting part for transmitting a message on the network, if required, 106 denotes a communication interface, and 21 denotes a core field. As described above, the core field 21 includes a network for communication between computers and the like, and is a communication space that connects objects to each other and functions as a basic unit for transmitting a message. The core field 21 may also be a LAN connecting a plurality of platforms to each other. The core field 21 also includes a virtual communication path in a platform connecting a number of objects to each other present in one platform. Furthermore, If a gateway having a router function for Internet working is provided on the core field 21, connection to an object on another core field can be conducted through the gateway.

Reference numeral 107 denotes a message type classifying/matching part. The message type classifying/matching part 107 stores and holds a message type dealt with by the message/action reaction relationship storing part 102. Furthermore, the message type classifying/matching part 107 analyzes a message type of a message received through the message receiving part 101, and matches the type of the received message with a message type dealt with by the message/action reaction relationship storing part 102. The message type classification can be appropriately determined by management of a system. For example, message type classification includes classification based on whether or not a message is described by XML language or text string tuple, and classification based on the number of tuples and a text configuration. Examples of message type classification will be described later. Because of the message type classifying/matching part 107, matching processing can be executed as follows: after a message transmitted on the core field 21 is received, the type of the received message is matched with a message type dealt with by the message/action reaction relationship storing part 102; the message whose type is not matched with the message type is discarded; and only the message whose type is matched with the message type is captured and given to the message/action reaction relationship storing part 102, whereby pattern matching processing of a message/action reaction is executed. Thus, selection of a message using a message type eliminates the necessity of fixing a message type even in an environment in which various platforms are present, and allows a message to be transmitted/received using a type suitable to each platform. Due to the reaction of any object which reacts to the message type, object collaboration processing can be conducted. Furthermore, selective receiving of a message eliminates useless message/action matching processing, and reduces a load of an object to be a reactor, thereby increasing the speed of matching processing. This is particularly advantageous in a large-scale system including a large number of collaborating objects.

Next, classification of a message type dealt with by the object collaboration apparatus of Embodiment 1 and message type matching processing will be described in detail.

Figure 4:
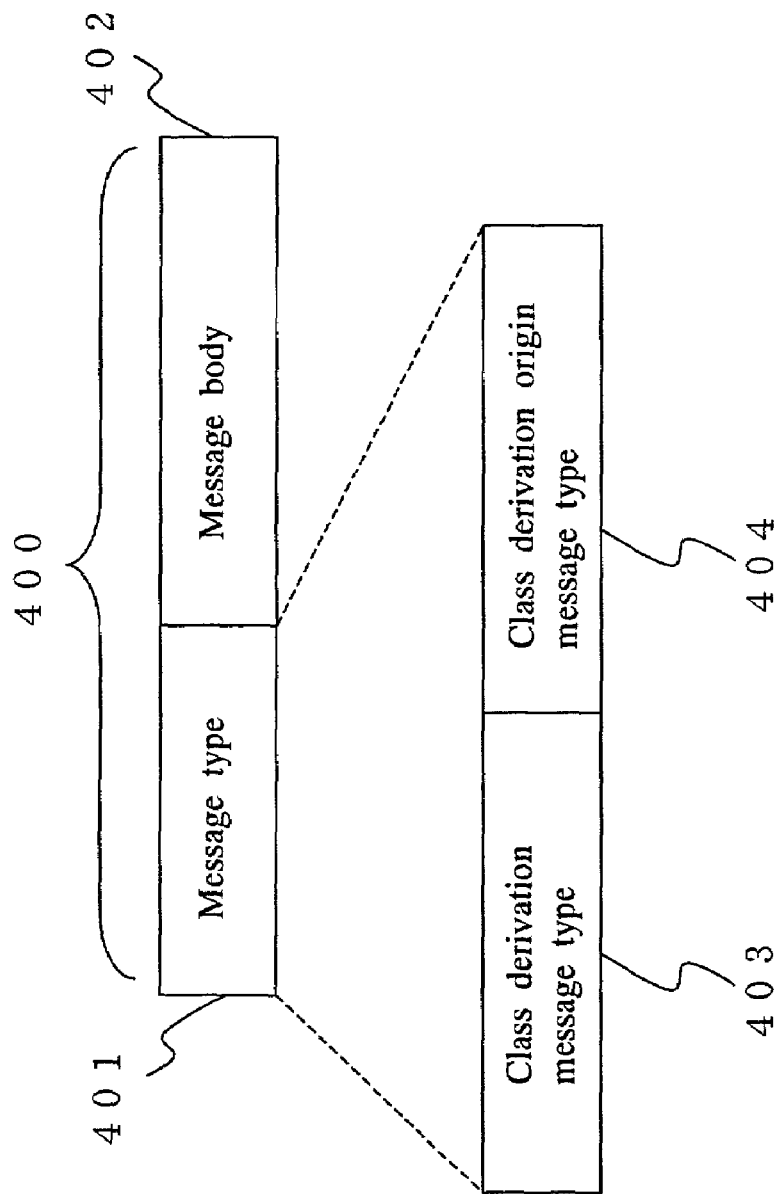
FIG. 4 shows an example of a message configuration dealt with by the object collaboration apparatus of Embodiment 1 according to the present invention.

FIG. 4 shows an example of a message configuration dealt with by the object collaboration apparatus of Embodiment 1. As shown in FIG. 4, a message 400 is composed of a message type 401 and a message body 402. As an option, the message type 401 may further have a hierarchical structure of a class derivation origin message type 403 and a class derivation message type 404. The message body 402 is a body of a message which corresponds to a message described in the message/action reaction table 103, and includes data required for an action, parameters, and the like. The message type 401 represents the type of a message type classification, and typically includes a message string tuple type, an XML message type, and the like. The message string tuple type is a group of one or a plurality of text strings, and can be classified into several patterns based on the number of a text string group and the ranking of meanings. Examples thereof includes, as in an English syntax, a first type (SV), a second type (SVO), and a third type (SVOO), where S, V, and O represent a subject, an action, and an object as signification of a message. This is only an example, and other types such as SVOOO can also be defined.

As an exemplary case where the message type 401 has a hierarchical structure of the class derivation origin message type 403 and the class derivation message type 404, there is a case where a particular message type can be further classified hierarchically. In the above-mentioned example, assuming that a message type is a message string tuple type, and a class derivation origin message type is SVO, SVO, SVOO, SVOOO, and the like including an SVO form can be specified as a class derivation message type.

The object collaboration apparatus includes one or a plurality of message/action reaction tables 103 on the basis of a message type, a class derivation message type, and a class derivation origin message type. For example, in an example shown in FIG. 3, a message/action reaction table of an XML message type can be denoted by 103a, and a message/action reaction table of a message type having a message string tuple type and an SVOO form can be denoted by 103b. In the case where two message/action reaction tables 103a and 103b are provided, the message type classifying/matching part 107 stores and holds an XML message type and a message type having a message string tuple type and an SVOO form, as a message type to be captured. A processing operation will be described as follows. For example, in the case where a message (class derivation origin message type 403 is described as XMLmsg) having an XML message type is transmitted on the core field 21, the message receiving part 101 captures the message through the communication interface 106. The captured message is given to the message type classifying/matching part 107, whereby matching of a message type is conducted. Since an XML message type is described in the class derivation origin message type 403, the message type classifying/matching part 107 captures the message by determining that the type of the message is matched with a message type in the class derivation origin message type 403. Then, the message type classifying/matching part 107 provides the message with information representing that the message is of the XML message type, and gives the message body 402 to the message/action reaction relationship storing part 102. The message/action reaction relationship storing part 102 searches for a corresponding action with the message body 402 as a search key, utilizing the message/action reaction table 103a corresponding to an XML message type. In the case where an action corresponding to the message body 402 is described, the action is executed (reacted). Next, for example, in the case where a message (in which the class derivation origin message type 403 is described as SVO, class derivation message type is described as SVOOO) having a message string tuple type and an SVOOO form is transmitted on the core field 21, the message receiving part 101 captures the message through the communication interface 106, and matching of a message type is conducted in the message type classifying/matching part 107. Since, a SVO type is described in the class derivation origin message type 403, a message derivation origin class is matched. However, since the class derivation message type is SVOOO, a message derivation class is not matched. The message type classifying/matching part 107 determines that matching of a message type of the received message is a fault to discard the message body 402, and does not give it to the message/action reaction relationship storing part 102.

As described above, by selecting a received message using a message type, only a message whose type is matched is captured, and a corresponding action is searched. Furthermore, by using a message/action reaction table classified on the message type basis, the load of an object can be reduced, and the speed of message/action reaction processing can be enhanced.

As described above, introduction of a message type allows an idea of inheritance in object-oriented programming to be introduced to matching processing of a message type. Hereinafter, for reference purposes, a specific example of introduction of a message type will be shown, which is conducted based on the notation of a class in object-oriented programming. FIGS. 5 and 6 respectively show examples dealing with a message type having a message string tuple type and an SVOO form and a message type described by XML such as XMLMsg.

In FIG. 5, the first line of the description shows that a message type "msg String Tuple" is derived from a message type "msg ObjType". Furthermore, the message type "msg String Tuple" contains "subject", "verb", "obj1", and "obj2" of a String form as its variables, and a function "isMatch" for conducting matching of a message type. The function "isMatch" conducts matching of a message type, which is characterized by being contained in a part of a transmitted message. Even in the case where a receiving object side does not have a type matching function of the message, it is possible to allow the object to dynamically have a matching function.

An example of FIG. 6 shows that a message type "XMLMsg" is derived from a message type "msgObjTtpe", and its variable is held as a type "Parser". Furthermore, the example shows that "XMLMsg" has a function "SetPattern" for setting a message type, and a function "isMatch" conducting matching of a message pattern.

Thus, introduction of a message type allows an idea of inheritance in object-oriented programming to be introduced to matching processing of a message type. Because of this, for example, it becomes possible to keep the consistency of type matching with respect to version up of the entire system. It is also possible to conduct matching of only a common portion between types inheriting the same type. Furthermore, introduction of a message type allows a matching logic of the type to be dynamically introduced from an external portion, if required, and the matching logic itself can be introduced/replaced in a system later.

EMBODIMENT 2

In Embodiment 2, an object collaboration apparatus will be described, which realizes synchronization collaboration of an object using an entity name rewrite object for describing a message using an anonymous entity name and rewriting an entity name.

A configuration of an object apparatus including an object collaboration apparatus of Embodiment 2 may be the same as that shown in FIG. 3, and the description of each element will be appropriately omitted here. In the object collaboration apparatus of Embodiment 2, a plurality of object apparatuses collaborate with each other through a core field, and one of them functions as an entity name rewrite object.

Hereinafter, a system of each object apparatus and its collaboration processing will be described as an example of synchronization collaboration processing of a mouse event. It is assumed that a message type utilized by each object is a message string tuple type and an SVOO form.

Figure 7:
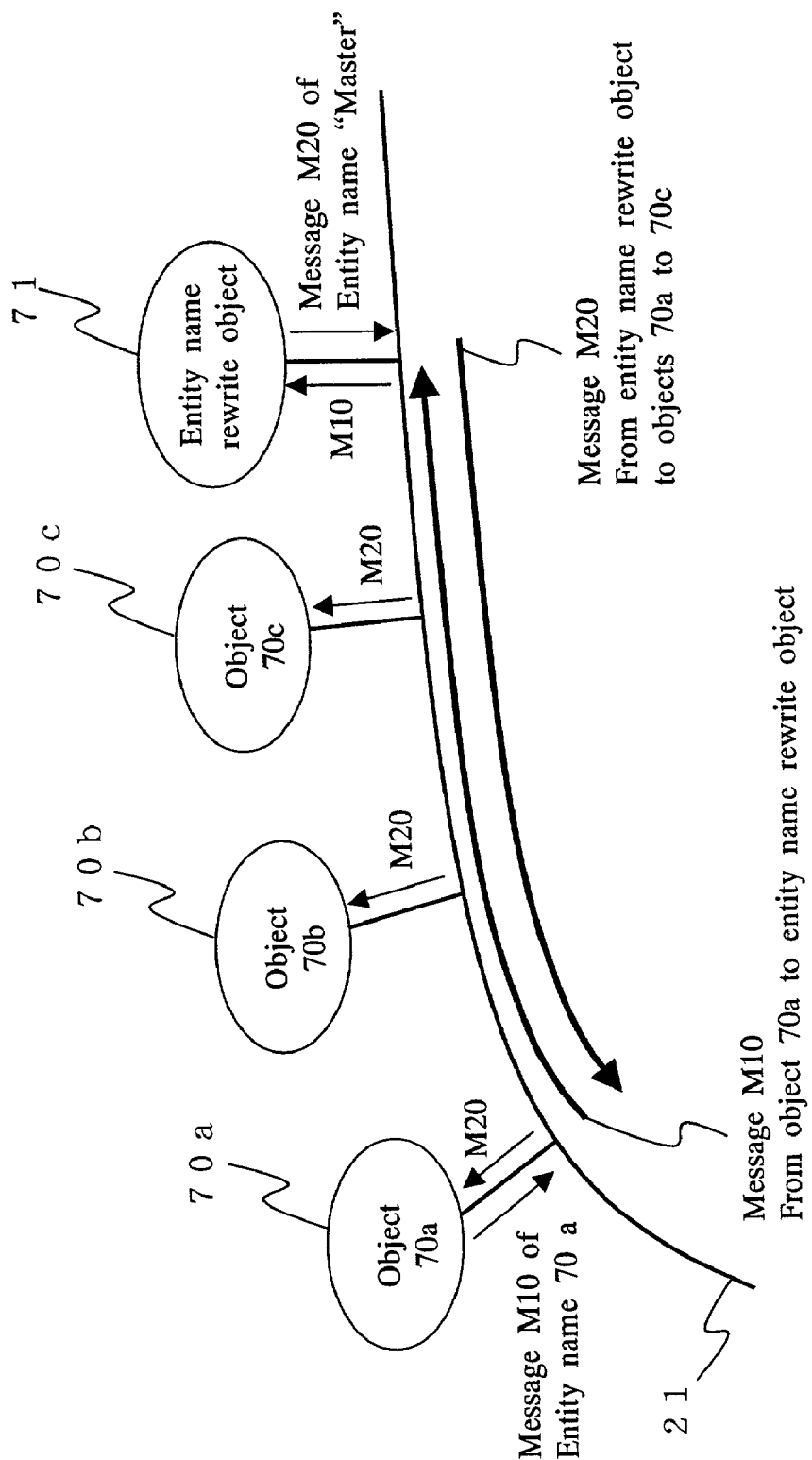
FIG. 7 is a view showing an idea in which reactor objects 70a to 70c and an entity name rewrite object 71 of Embodiment 2 according to the present invention are provided on a core filed 21, and synchronization processing is conducted.
Figure 9:
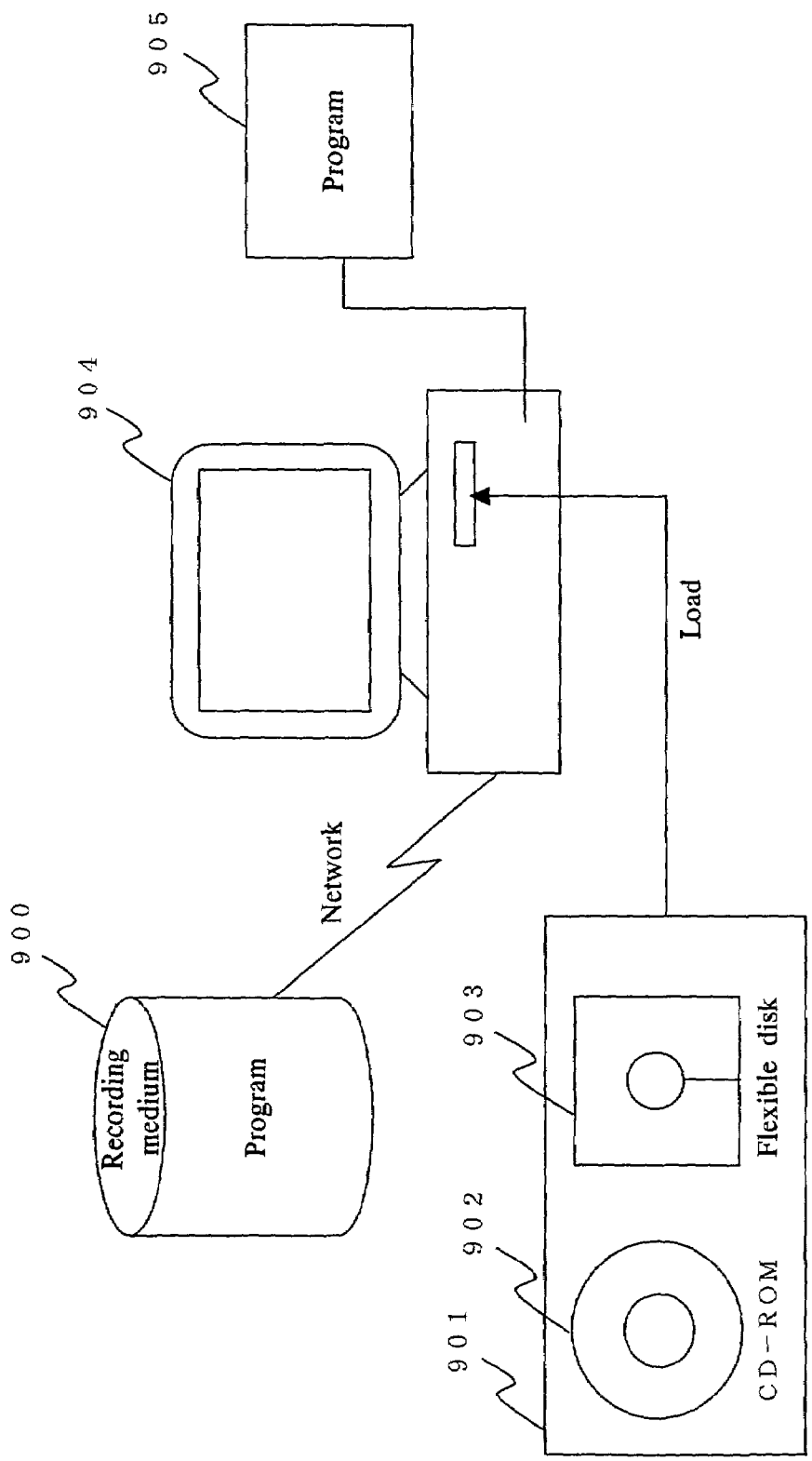
FIG. 9 shows examples of recording media of Embodiment 3 according to the present invention, and an exemplary system configuration using a processing program of the recording media.
Figure 10:
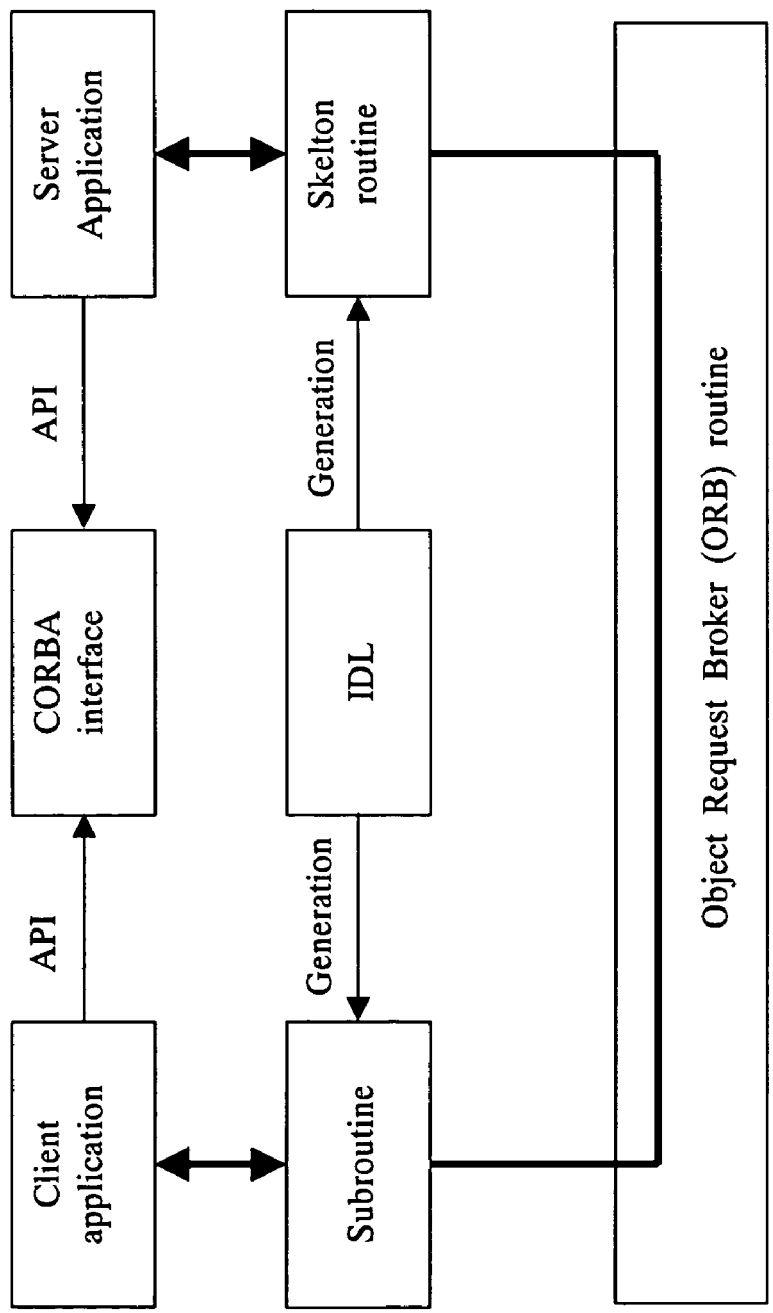
FIG. 10 shows an example of object collaboration in a client/server system based on CORBA of the prior art.

As shown in FIG. 7, objects 70a, 70b, and 70c to be reactors executing synchronization processing of a mouse event are provided on the core field 21. Furthermore, an entity name rewrite object 71 is provided on the core field 21. The objects 70a to 70c and the entity name rewrite object 71 may be provided on separate platforms. Furthermore, a plurality of objects may be configured on the same computer platform.

Correspondence relationships between the message and the action shown in FIGS. 8A to 8C are registered in the message/action reaction tables of the objects 70a, 70b, and 70c to be reactors. More specifically, correspondence of an action "Move" is registered with respect to SVOO of an message: "Master", "MouseMove", "(X-coordinate)", and "(Y-coordinate)". Herein, the action "Move" gives "(X-coordinate)" and "(Y-coordinate)" obtained from a message to an OS controlling a pointing device as if a mouse event occurred on a machine. Thus, the respective objects 70a, 70b, and 70c operate a mouse so as to be synchronized with a mouse event generated by an object whose subject is "Master".

On the other hand, a correspondence relationship between the message and the action shown in FIG. 8D is registered in the entity name rewrite object 71. More specifically, an action "MasterOut" is described with respect to SVOO of a message: "*", "MouseMove", "(X-coordinate)", and "(Y-coordinate)". Herein, "*" in the message represents a wild card, and corresponds to all the objects whose messages can be received by the entity name rewrite object 71. More specifically, the entity name rewrite object 71 reacts to all the messages representing a mouse event: "MouseMove" "(X-coordinate)", and "(Y-coordinate)" transmitted on the core field. An action "MasterOut" represents an action for transmitting a message shown in FIG. 8E on the core field 21. As is apparent from comparison between FIGS. 8D and 8E, this action transmits a message of "Master", "MouseMove", "X-coordinate)", and "(Y-coordinate)" with respect to a message received as "*", "MouseMove", "(X-coordinate)", and "(Y-coordinate)", and rewrites the entity name from "*" to "Master". A message whose entity name is rewritten by the entity name rewrite object 71 is received by the objects 70a, 70b, and 70c, and synchronization processing of a mouse event is conducted in accordance with the coordinates described on the respective objects 70a to 70c.

Furthermore, by rewriting a message/action reaction table held by the entity name rewrite object 71, it becomes possible to flexibly and easily change synchronization processing. For example, when the message/action reaction table of the entity name rewrite object 71 is rewritten from "*" to "object 70a", the entity name rewrite object 71 reacts to only a mouse event generated by the object 70a in accordance with FIG. 8D. Then, the entity name rewrite object 71 rewrites the entity name of the object 70a to "Master", and transmits a message containing mouse event information to the core field 21. The objects 70a, 70b, and 70c react to a message having the entity name "Master" to synchronize a mouse event, in accordance with FIGS. 8A to 8C. As a result, the mouse events of the objects 70a, 70b, and 70c are processed in synchronization with the mouse event generated by the object 70a. Herein, the object 70a itself reacts to the message having the entity name "Master" to synchronize a mouse event, in accordance with FIG. 8A. According to this method, a rule of keeping synchronization with respect to the entity name "Master" can be always ensured. Therefore, even when the entity name rewrite object 71 rewrites "*" to another entity name, the object 70a can be synchronized to a mouse event of an entity name immediately after rewriting. Thus, synchronization processing can be flexibly and easily changed only by rewriting the message/action reaction table of the entity name rewrite object 71.

As described above, according to the object collaboration apparatus of the present invention, objects subjected to synchronization processing are loosely provided based on a message/action reaction relationship of the contents of synchronization in accordance with an entity having a master authority, and the object entity having a master authority can be changed to any object only by rewriting the contents of a message/action reaction table of the entity name rewrite object, whereby synchronization processing between objects can be changed easily, flexibly, and dynamically.

EMBODIMENT 3

An object collaboration apparatus of the present invention can be configured using various computers, by recording a program describing processes for realizing the above-mentioned configuration on a computer-readable recording medium. Examples of a recording medium storing a program containing processes for realizing the object collaboration apparatus of the present invention include a recording medium 900 in a recording apparatus on a network and a recording medium 905 such as a hard disk and a RAM of a computer, as well as a portable recording medium 901 such as a CD-ROM 902 and a flexible disk 903. In execution, the program is loaded onto a computer 904 and executed on a main memory.

In addition to a compiled source program, the following configuration may also possible: an applet is transmitted to a client computer through a network, and is executed by an interpreter on the client computer.

INDUSTRIAL APPLICABILITY

According to the object collaboration apparatus of the present invention, a degree of freedom of collaboration between object collaboration apparatuses connected to a network can be enhanced, and collaboration processing such as interaction and collaboration of a computer group or an object group is conducted, whereby a change in an environment in an object-oriented environment can be flexibly handled.

According to the object collaboration apparatus of the present invention, a received message is selected using a message type. Thus, only a message whose type is matched is captured, and a corresponding action is searched for. Furthermore, a message/action reaction table in which message types are classified can be used, and unnecessary message/action matching processing is eliminated, whereby the load of an object can be reduced and the speed of message/action reaction processing can be enhanced. Furthermore, introduction of a message type allows an idea of inheritance in object-oriented programming to be introduced to matching processing of a message type. Because of this, for example, the consistency of matching of a type can be kept with respect to version up of the entire system. It is also possible to conduct matching of only a common portion between types inheriting the same type.

According to the object collaboration apparatus of the present invention, objects subjected to synchronization processing are loosely provided based on a message/action reaction relationship of the contents of synchronization in accordance with an entity having a master authority, and the object entity having a master authority can be changed to any object only by rewriting the contents of a message/action reaction table of an entity name rewrite object, whereby synchronization processing between objects can be changed easily, flexibly, and dynamically.

The invention claimed is:

1. An object collaboration apparatus operated in accordance with a message an action relationship, comprising:
   a memory;
   a message receiving part that allows each object to monitor and capture a message transmitted among objects on a network, said message including a message type and a message body, said message type indicating a syntax of the message body and said message body being described in a syntax indicated by the message type;
   a message and action relationship storing part that stores a content of an action that is a reaction to the message and includes instructions defining a processing to be executed by the object, when a message is given, searches for the content of an action corresponding to the given message by using the message body of the give message as a search key;
   an action executing part that executes processing in accordance with the content of an action obtained as a search result by the message and action relationship storing part;
   a message type classifying and matching part, the message type classifying and matching part stores a message type dealt with by the message and action relationship storing part, conducts matching processing for determining whether or not a message type of the received message is matched with the message type dealt with by the message and action relationship storing part, and if matched, gives the received message to the message and action relationship storing part; and
   an entity name rewrite object for, with respect to a message received from one object entity, rewriting object entity name information in a message representing the one object entity to another object entity name information representing anther object entity, and returning the message to the network.

2. An object collaboration apparatus according to claim 1, wherein classification of the message type has a hierarchy, and a message type header representing the message type contains information representing the hierarchy of the classification of the message type, and
   by applying the hierarchy of the classification of the message type, the message type classifying and matching part stores and holds a message type dealt with by the message and action relationship storing part, analyzes a message type of the received message, and conducts matching of the message type.

3. An object collaboration apparatus according to claim 2, wherein the message type is defined by using an idea of inheritance in object-oriented programming, and the hierarchy of the classification of the message type contains a hierarchy of classification of a class derivation message type and a class derivation origin message type.

4. An object collaboration apparatus operated in accordance with a message and action relationship, comprising:
   a memory;
   a message receiving part that allows each object to monitor and capture a message transmitted among objects on a network, said message including a message type and a message body, said message type indicating a syntax of the message body and said message body being described in a syntax indicated by the message type;
   a message and action relationship storing part that stores a content of an action that is a reaction to the message and includes instructions defining a processing to be executed by the object, when a message is given, searches for the content of an action corresponding to the given message by using the message body of the given message as a search key;
   an action executing part that executes processing in accordance with the content of an action obtained as a search result by the message and action relationship storing part;
   a message type classifying and matching part, the message type classifying and matching part stores a message type dealt with by the message and action relationship storing part, conducts matching processing for determining whether or not a message type of the received message is matched with the message type dealt with by the message and action relationship storing part, and if matched, gives the received message to the message and action relationship storing part; and
   an entity name rewrite object for, with respect to a message received from one object entity, rewriting object entity name information in a message representing the one object entity to another object entity name information representing another object entity, and returning the message to the network.

5. An object collaboration apparatus according to claim 4, wherein for synchronization processing between objects, action contents desired to be subjected to the synchronization processing are described by using the object entity name to be an entity name rewrite target by the entity name rewrite object, in the message and action relationship storing part of an object to be a slave, and
   the entity name rewrite object rewrites the object entity name written as the entity name rewrite target into an object entity name to be a master object of the synchronization processing.

6. A computer-readable recording medium storing a processing program for realizing an object collaboration apparatus operated in accordance with a message and action relationship, the program comprising:
   a message receiving processing operation of allowing each object to monitor and capture a message transmitted among objects on a network, said message including a message type and a message body, said message type indicating a syntax of the message body and said message body being described on a syntax indicated by the message type;
   a message and action relationship storing processing operation of storing a content of an action in a memory that is a reaction to the message and includes instructions defining a processing to be executed by the object, when a message is given, searching for the content of an action corresponding to the given message by using the message body of the given message as a search key;
   an action executing processing operation of executing processing in accordance with the content of an action obtained as a search result by the message and action relationship storing processing operation;
   a processing operation of storing a message type dealt with in the message and action relationship storing processing operation;
   a processing operation of conducting matching processing for determining whether or not a type of the received message is matched with the message type dealt with by the message and action relationship storing processing operation;

a processing operation of giving the message to the message and action relationship storing part only in a case where the message type of the received message is matched in the matching processing; and a processing operation of rewriting object entity name information in a message representing the one object entity to another object entity name information representing another object entity, and returning the message to the network.

7. A computer-readable recording medium storing a processing program for realizing an object collaboration apparatus for rewriting an entity name of a message transmitted by one object to an entity name of another object, operated in accordance with a message and action relationship, the program comprising:

a message receiving processing operation of allowing each object to monitor and capture a message transmitted among objects on a network, said message including a message type and a message body, said message type indicating a syntax of the message body and said message body being described in a syntax indicated by the message type;

a message and action relationship storing processing operation of storing a content of an action in a memory that is a reaction to the message includes instructions defining a processing to be executed by the object, and, when a message is given, searching for the content of an action corresponding to the given message by using the message body of the given message as a search key;

an action executing processing operation of executing processing in accordance with the content of an action obtained as a search result by the message and action relationship storing processing operation;

a message type classifying and matching part, the message type classifying and matching part stores a message type dealt with by the message and action relationship storing part, conducts matching processing for determining whether or not a message type of the received message is matched with the message type dealt with by the message and action relationship storing part, and if matched, gives the received message to the message and action relationship storing part; and an entity name rewrite processing operation of, with respect to a message received from one object entity, rewriting object entity name information in a message representing the one object entity to another object entity name information representing another object entity, and returning the message to the network.

8. An object collaboration apparatus operated in accordance with a message and action relationship, comprising:

a memory;

a message receiving part that allows an object to monitor and capture a message transmitted among objects on a network, said message including data required for an action or parameters and being composed of a message type and a message body wherein said message type indicates a syntax of the message body and includes a hierarchical structure of a class derivation original message type and said message body is described in a syntax indicated by the message type;

a message and action relationship storing part that stores a content of an action that is a reaction to the message and includes instructions defining a processing to be executed by the object, when a message is given, searching for the content of an action corresponding to the given message by using the message body of the given message as a search key;

an action executing part that executes processing in accordance with the contents of the action obtained as a search result by the message and action relationship storing part;

a message type classifying and matching part, the message type classifying and matching part stores a message type dealt with by the message and action relationship storing part, conducts matching processing for determining whether or not a message type of the received message is matched with the message type dealt with by the message and action relationship storing part, and if matched, gives the received message to the message and action relationship storing part; and an entity name rewrite object for, with respect to a message received from one object entity, rewriting object entity name information in a message representing the one object entity to another object entity name information representing another object entity, and returning the message to the network.

* * * * *

UNITED STATES PATENT AND TRADEMARK OFFICE
CERTIFICATE OF CORRECTION

PATENT NO. : 7,584,252 B2 Page 1 of 1
APPLICATION NO. : 09/988566
DATED : September 1, 2009
INVENTOR(S) : Makoto Okada et al.

It is certified that error appears in the above-identified patent and that said Letters Patent is hereby corrected as shown below:

Column 13, Line 8, change "an" to --and--.

Column 13, Line 21, change "give" to --given--.

Column 13, Line 40, change "anther" to --another--.

Signed and Sealed this

Fifteenth Day of December, 2009

David J. Kappos
*Director of the United States Patent and Trademark Office*